Feb. 1, 1938.  J. H. SHERTS ET AL  2,106,766
PROCESS FOR MAKING SAFETY GLASS
Filed Dec. 22, 1934  4 Sheets—Sheet 2
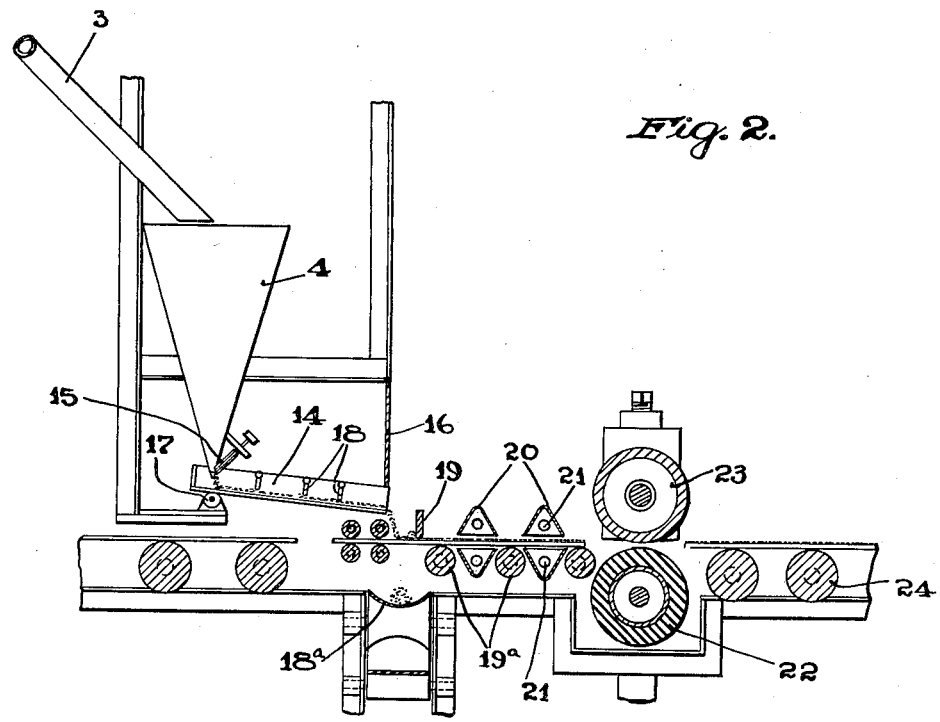
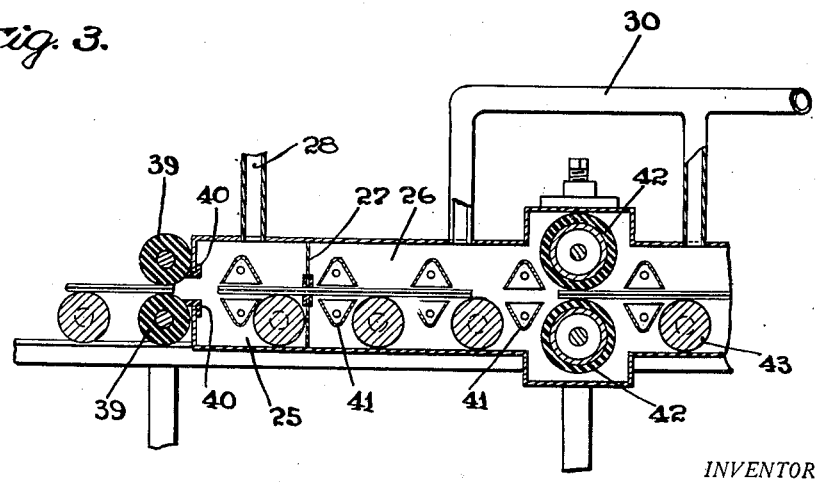
INVENTORS
JAMES H. SHERTS AND
BROOK J. DENNISON
BY Bradley + Bell
ATTORNEYS.

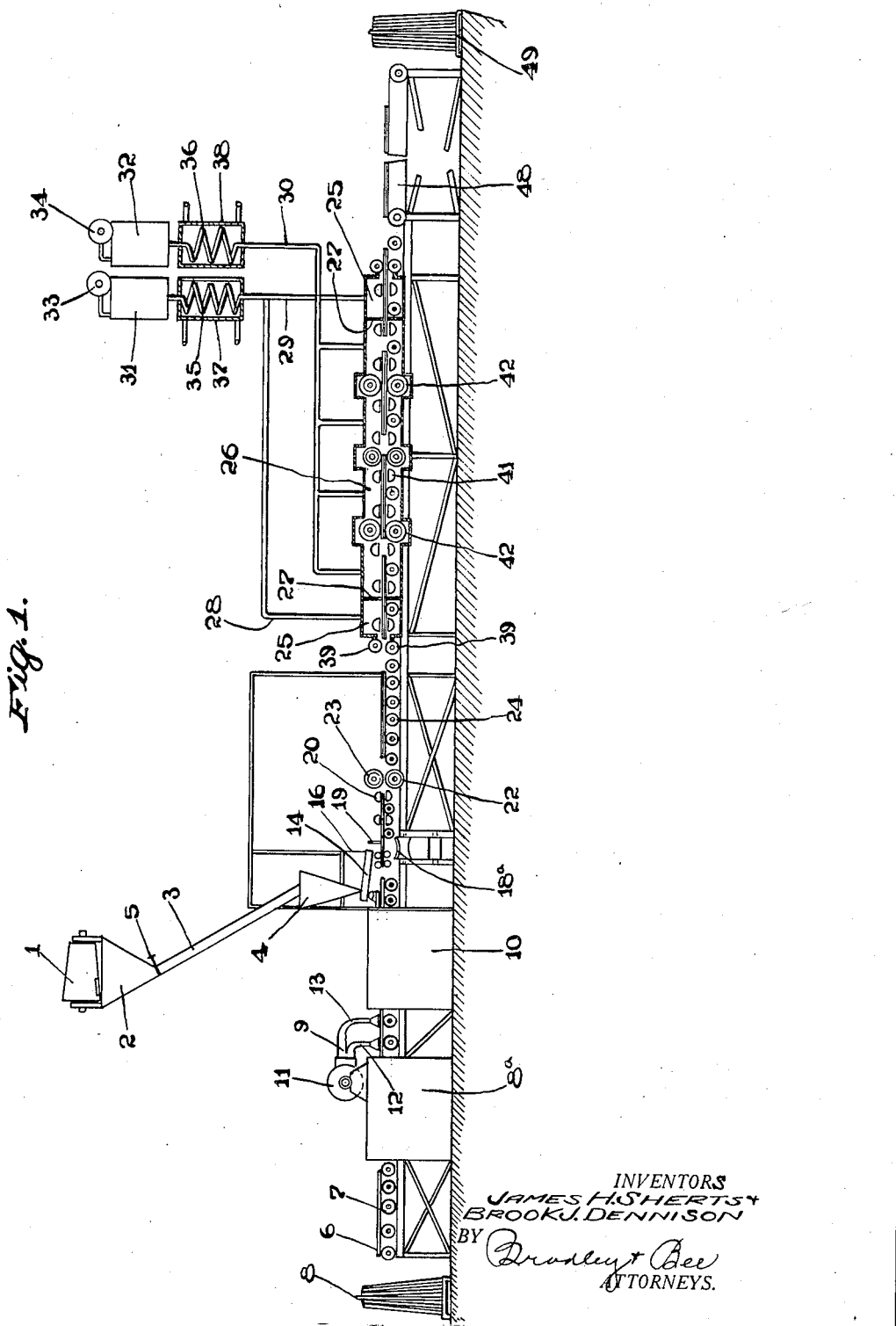

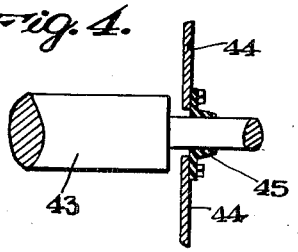
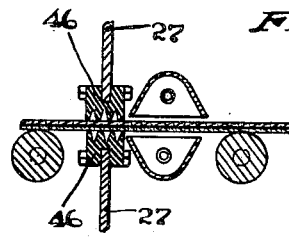
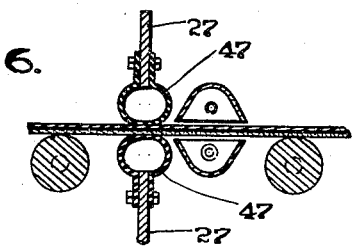
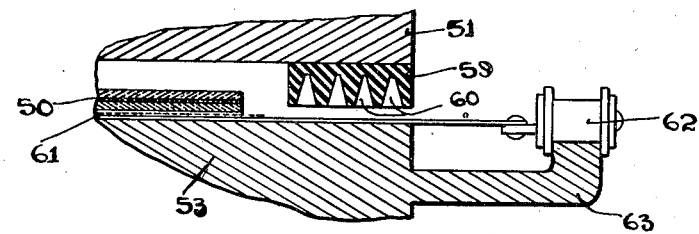
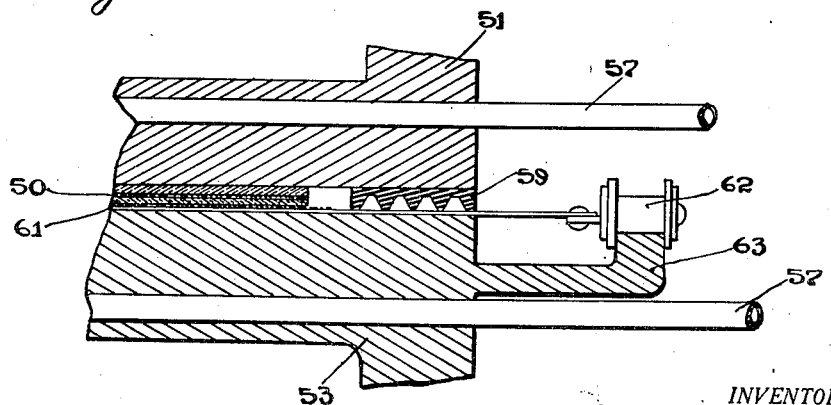

Patented Feb. 1, 1938

2,106,766

UNITED STATES PATENT OFFICE 2,106,766

PROCESS FOR MAKING SAFETY GLASS

James H. Sherts and Brook J. Dennison, Tarentum, Pa., assignors to Duplate Corporation, a corporation of Delaware Application December 22, 1934, Serial No. 758,786

4 Claims. (Cl. 49—81)

Figure 7:
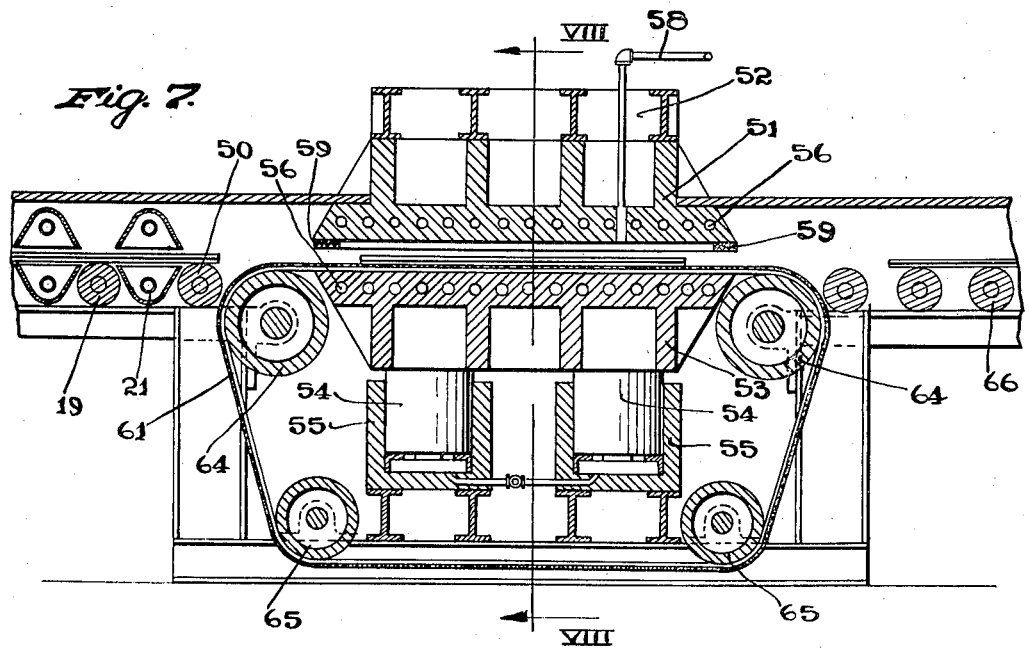
Figure 8:
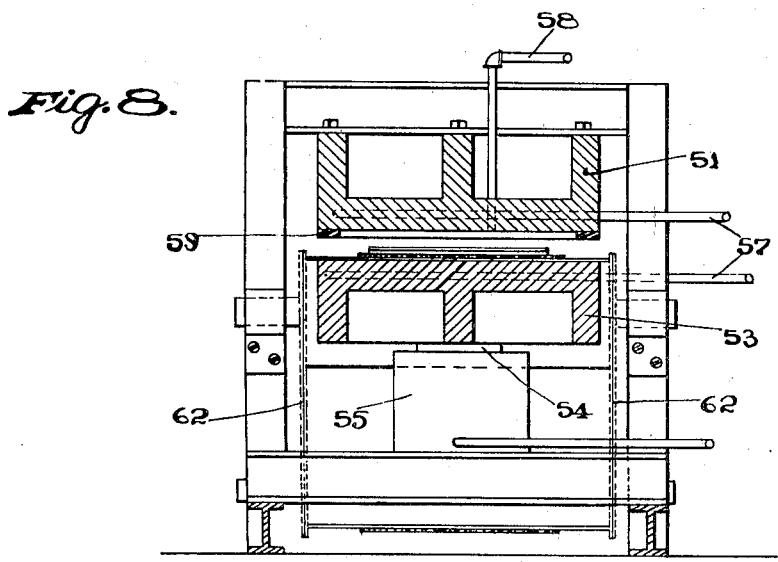

The invention relates to a process and apparatus for making safety glass which ordinarily comprises a pair of glass sheets or plates secured to the opposite sides of a sheet of reinforcing material. The present invention is directed to the making of glass of the kind specified in those cases in which the reinforcing or interlayer consists of a synthetic resin. The invention is hereinafter described in connection with a vinyl resin, such as vinyl acetal or vinyl chlor acetate, but it will be understood that the invention is of broad application and may be used with many other resins, such as the glyptals, toluene sulfonamide derivatives and the like. It has for its principal objects the provision of an improved process and apparatus in which the plasticized resin in divided or powder form may be incorporated into the lamination directly without the use of solvent and without preforming into sheets, thus greatly simplifying the procedure and cheapening the product. A further object is the provision of a process and apparatus which may be applied in a continuous straight away operation to further reduce labor and operating costs and give a high volume of production in a limited factory area. Apparatus for carrying out the process is illustrated in the accompanying drawings, wherein:

Figure 1 is a side elevation partially in section of the complete apparatus. Figs. 2 and 3 are enlarged sections through portions of the apparatus shown in Fig. 1. Figs. 4 and 5 are enlarged detail views relating to the construction of Fig. 1. Fig. 6 is a detail of a modification. Figs. 7 and 8 are sections through a modification, Fig. 7 being a section on the line VII—VII of Fig. 8, and Fig. 8 being a section on the line VIII—VIII of Fig. 7. Figs. 9 and 10 are enlarged sectional detail views relating to the construction of Figs. 7 and 8 and showing the lower platen in two positions.

Referring to the apparatus shown in Figs. 1 to 5, 1 is a mixer in which powdered resin and plasticizer are mixed, the plasticized mixture being received in a hopper 2 and conducted through a pipe 3 to the hopper 4, a suitable valve 5 being provided for controlling the flow of the plasticized resin. The resin as supplied to the mixer 1 is preferably divided so that it will pass through a screen of 80 mesh, and the proportion of resin to plasticizer is in the ratio of 6 to 4, the resin in this case being vinyl acetal and the plasticizer diethyl phthalate. The plasticized resin is still in solid powder form after it is plasticized so that it will flow freely to the hopper 4.

The glass sheets 6 which are to be laminated are brought into position adjacent the end of the conveyor 7 on suitable racks 8 and are then carried along the conveyor past the washer 8a and the dryer 9 and through a heating oven 10, which brings the glass plates on the conveyor to a relatively high temperature to promote the adhesion of the powdered resin thereto as it is fed from the hopper 4, as later described. The dryer 9 may be of any desired form and includes a driven fan blower 11, as shown, with conduits 12 and 13 arranged so that air is discharged through the conduits 12 and exhausted through the conduits 13.

The means for distributing the plasticized resin from the hopper 4 onto the upper surfaces of the glass sheets as they pass along the conveyor is shown most clearly in Fig. 2, wherein 14 is in an inclined pan to which the hopper discharges past the control gate 15. This pan is suspended at its front end upon the flexible member 16 and supported at its rear end upon a driven eccentric 17 so that the pan is given an oscillating movement up and down in order to promote the flow of powdered resin therethrough. Leveling scrapers 18 are preferably provided in the pan with their lower edges above the bottom of the pan in order to promote the spreading of the resin into a layer of uniform thickness across the width of the pan. The front end of the pan discharges upon the glass sheets as they pass therebeneath, and any excess resin which falls between the successive plates or which is scraped from the plates falls into a concave cross feed belt 18a which passes around suitable driven pulleys and discharges to a receptacle which is not shown. Just forward of the end of the pan 14 is a cross scraper 19 for insuring a proper distribution of the resin across the width of the plate and for giving it its proper thickness. In order to facilitate the action of this scraper, suitable means (not shown) are provided for giving the scraper a back and forth endwise movement.

After the plates pass the scraper, they pass along conveyor rolls 19a and past reflectors 20 carrying heating elements 21. The application of this heat softens the plasticized resin particles so that they will adhere together and to the heated glass plates. After the heating operation, the plates pass over a roll 22 having a soft surface and beneath a polished metal roll 23 which applies pressure to the resin layer and compacts it into a smooth coat of uniform thickness. This roll is relatively cool so that the resin will not adhere thereto. In some cases it may be necessary to blow air through this roll or apply other suitable cooling means.

When the glass plates emerge upon the conveyor rolls 24 forward of the presser roll 23, every alternate plate is removed from the conveyor and inverted in position and placed upon the next plate so that the resin layers on the two plates come together preliminary to the laminating operation. This is the preferred method of operation at this point, although if desired, the operation may be conducted by merely placing plates of glass without resin over the resin layers on the plates carried by the conveyor. In this case the thickness of the resin layer will necessarily be twice that required in the operation above described, in which each plate carries one-half of the resin interlayer.

It is now necessary to colloid the resin layer between the glass plates and bring such plates to completely laminated condition, and in order to accomplish this result, the sandwiches must be subjected to a very considerable amount of heat and pressure. In some cases this operation may be carried out in the open air, but it is preferably carried out in a vacuum chamber so that the resin layers between the glass plates are subject to suction, so as to remove the air which is distributed through the layers. This insures that when the pressing operation is completed, no bubbles will be present in the interlayer. One form of vacuum chamber for accomplishing this result is shown in detail in Fig. 3. This chamber is preferably made in the form of three compartments 25, 25 and 26 (Fig. 1) with partitions 27 therebetween which have flexible lips for engaging the glass sheets and for contacting together at the spaces between the glass plates in order to maintain the independence of the chambers. These chambers are provided with suction pipes 28, 29 and 30 leading to the vacuum tanks 31 and 32, such tanks being exhausted by means of the pumps 33 and 34. The exhaust gases are preferably conducted through coils 35 and 36 on their way to the tanks, such coils lying in containers 37 and 38, through which water is circulated in order to cool the gases. The purpose of the end chambers 25, 25 is to insure a better vacuum in the chamber 26 since any leakage into the chamber 26 thus comes from the chambers 25, 25, which are maintained under fairly good exhaust conditions. In order to maintain a seal at the ends of the chambers 25, 25, a pair of soft rolls 39, 39 are provided at each of said ends, which engage the glass sheets when the sheets lie therebetween and engage each other at the spaces between the sheets. The space between these rolls and the ends of the chambers 25 is provided with a seal by means of the flexible lips 40. Reflector heaters 41 are provided above and below the travel of the glass in the vacuum chambers in order to give the necessary temperature for colloiding the resin interlayer, such temperature being in the neighborhood of 220 deg. F. It is also necessary to subject the sandwiches to pressure, and this is accomplished by the series of pairs of presser or nipper rolls 42, 42, which have their surfaces covered with soft material, such as some form of rubber composition. Sealing means is provided at the ends of the conveyor rolls 43 and also at the ends of the nipper rolls by the means illustrated in Fig. 4, the axle of the roll where it passes the wall 44 of the chamber being engaged by a flexible lip member 45, which presses against the axle. The sealing means between the ends of the partition members 27, 27 is illustrated in detail in Fig. 5, each of the plates 27, 27 being provided with flexible members 46 of rubber or the like having a plurality of lips which insures a better seal than if a single lip were used. In the modification shown in Fig. 6, the edges of the partition plates 27, 27 are provided with the seals 47, 47, which are in the form of hollow flexible tubes under air pressure.

The laminated plates, as they emerge from the vacuum chamber, are received upon a conveyor 48 which carries them to the right where they are received by the operator and placed upon the racks 49, thus completing the operation. If desired, these plates may be subject to a further hydraulic pressing employing the method set forth in the Sherts and Hamill Patent No. 1,781,084.

Figs. 7 to 10 illustrate a modification, wherein a hydraulic press takes the place of that part of the apparatus heretofore described and shown in Fig. 3. This press provides the necessary heat and pressure for colloiding the resin interlayer between the glass plates and compacting it. The sandwiches 50 are brought to the press upon the conveyor rolls 19 past the heaters 21, the delivery operation being an intermittent one since the operation of the press is intermittent. The upper platen 51 of the press is supported in fixed position from the framework 52, while the bottom platen 53 is moved upwards by a plurality of plungers 54 carried by the hydraulic cylinders 55. The platens are heated by means of steam which circulates through passages 56 supplied from the connections 57. It is desirable in this pressing operation to exhaust the air from the space between the platens during the pressing operation, and in order to accomplish this result, an exhaust pipe 58 is provided leading to a suitable exhausting apparatus. In order to provide a seal between the platens during the pressing and exhausting operation, the upper platen is preferably provided with a sealing strip 59 (Figs. 9 and 10) of rubber extending around the periphery of the platen. This platen is grooved, as indicated at 60, in order to improve the seal. In order to carry the sandwiches into the press, a belt 61 is employed carried at its edges by the chains 62 riding on suitable supports 63 carried by the lower platen, as indicated in Figs. 9 and 10. The belt 63 may be of rubber or copper mesh or thin sheet metal. The chains pass around suitable pulleys 64, 64 and 65, 65, one of which is driven to give the belt its necessary intermittent travel into and out of the press. After a sandwich has been carried into the press, the lower platen is moved up to seal the pressing chamber and apply the necessary pressure to the sandwich, at which time the air in the pressing chamber is exhausted through the pipe 58. The heated platens supply the necessary heat for colloiding the sheet during the pressing operation. A temperature of 220 deg. F. and a pressure of about 150 pounds per square inch is preferably employed, although these conditions may vary within a considerable range, depending upon the character of the resin and the time period to which the sandwich is subjected. After the pressing operation is completed, the platen 53 is lowered and the sandwich is moved out of the press by the belt and onto the driven conveyor rolls 66, thus completing the operation. It is also possible to use this apparatus without the sealing members 59 as a substitute for the pressing and smoothing rolls 22 and 23 of the Fig. 1 construction. When the press is used in this way, it is necessary to prevent the resin on the glass plates from adhering to the upper platen 51, and this platen is, therefore, cooled by a circulation of water therethrough instead of being heated. In using the apparatus of Figs. 7 and 8, the operation of the conveying means throughout is necessarily intermittent instead of continuous as in the construction of Fig. 1. The apparatus of Figs. 7 and 8 presents one advantage over that of Fig. 1, in that it is easier to maintain vacuum conditions in the pressing chamber than is the case with the apparatus of Fig. 1.

What we claim is:

1. A process of making safety glass which consists in applying a layer of plasticized resin in powder form to a glass plate which layer is heated and pressed onto the plate so that the particles adhere to each other and to the plate but without colloiding, assembling a second glass plate on the first plate with the resin layer therebetween and subjecting the sandwich thus formed to pressure and to sufficient heat to colloid the layer into a solid transparent sheet tightly adherent to the glass sheets.

2. A process of making safety glass which consists in applying a layer of plasticized resin in powder form to the faces of a pair of glass plates which layers are heated and pressed onto the plates so that the particles of resin adhere to each other and to the plates but without colloiding, applying one plate thus prepared on the other so that the resin layers contact, and then subjecting the sandwich thus formed to pressure and to sufficient heat to colloid the layers into a single solid sheet and cause such sheet to adhere tightly to the glass sheets.

3. A process of making safety glass which consists in applying a layer of plasticized resin in powder form to a glass plate which layer is heated and pressed onto the plate so that the particles adhere to each other and to the plate but without colloiding, assembling a second glass plate on the first plate with the resin layer therebetween and subjecting the sandwich thus formed to pressure and to sufficient heat to colloid the layer into a solid transparent sheet tightly adherent to the glass sheets, the air being exhausted from the space surrounding the sandwich during the heating and pressing operation to free the resin from the air.

4. A process of making safety glass which consists in applying a layer of plasticized resin in powder form to the faces of a pair of glass plates which layers are heated and pressed onto the plates so that the particles of resin adhere to each other and to the plates but without colloiding, applying one plate thus prepared on the other so that the resin layers contact, and then subjecting the sandwich thus formed to pressure and to sufficient heat to colloid the layers into a single solid sheet and cause such sheet to adhere tightly to the glass sheets, the air being exhausted from the space surrounding the sandwich during the heating and pressing operation to free the resin from air.

JAMES H. SHERTS.
BROOK J. DENNISON.